Oct. 28, 1969                M. V. SCHNEIDER                3,475,609
                       OPTICAL ENERGY CONVERSION DEVICES
Filed July 15, 1966                                    3 Sheets-Sheet 1
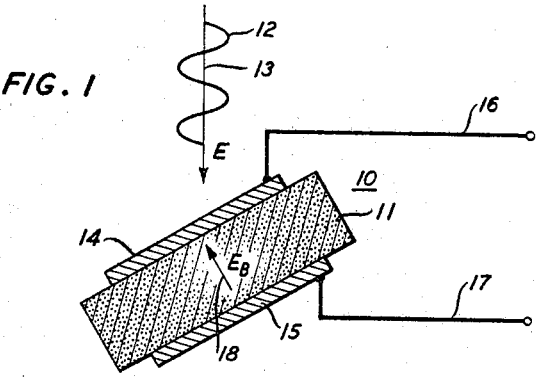
FIG. 1
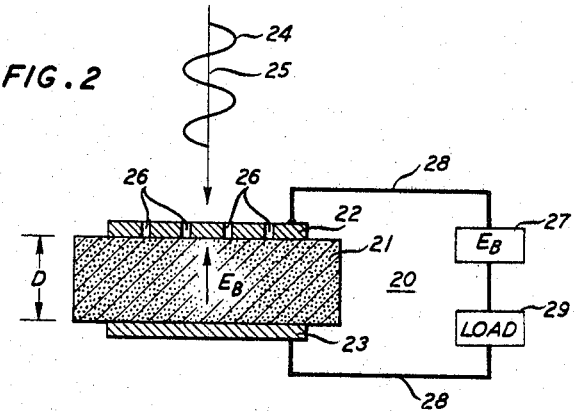
FIG. 2
FIG. 4
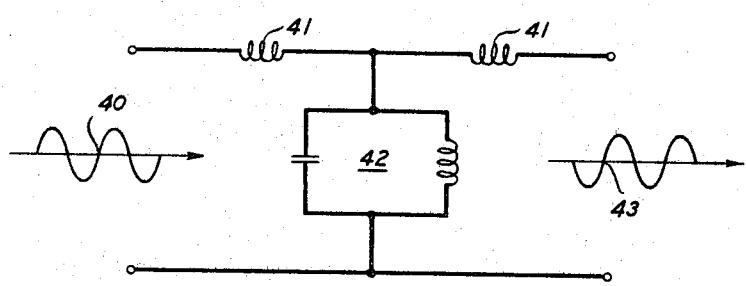
INVENTOR
M. V. SCHNEIDER
BY Kenneth W. Mateer
ATTORNEY

# United States Patent Office 3,475,609
Patented Oct. 28, 1969

3,475,609
OPTICAL ENERGY CONVERSION DEVICES
Martin V. Schneider, Middletown, N.J., assignor to Bell Telephone Laboratories, Incorporated, Murray Hill, Berkeley Heights, N.J., a corporation of New York
Filed July 15, 1966, Ser. No. 565,506
Int. Cl. H04b 9/00
U.S. Cl. 250—199                        14 Claims

ABSTRACT OF THE DISCLOSURE

A more efficient device for coupling optical energy into a bulk material is effected by providing the metal electrodes on the surface of the material with apertures which are resonant or nearly resonant at the frequency of the incident energy.

---

This invention relates to optical electromagnetic wave energy coupling and, more particularly, to efficient optical energy conversion in devices which require metallic electrodes on their boundaries.

Typical prior art arrangements for coupling optical energy into solid insulating or semiconductive material comprise a direct transition through a plane dielectric boundary or a transition through a thin matching layer which acts as a quarter wave transformer. These coupling methods are simple and effective for optoelectronic devices whic hrequire an electric biasing field normal to the direction of propagation of the optical wave. In this specification, the term optoelectronic device is intended to refer to a solid body with metal electrodes in which an incident optical wave interacts with the solid in the presence of an electric field which is applied by the electrodes.

However, in many cases, the required electric field is other than normal to the propagation direction of the incident optical energy. In such arrangements, the metallic electrodes by which the field is impressed would typically be, at least in part, interposed between the incident energy and the bulk material in which conversion is to occur. The presence of the electrodes in this fashion introduces undesirable losses.

Optical waves can be coupled into solid material through metal electrodes if the metal contact is very thin, typically of the order of a few hundred Angstroms. This type of coupling has the advantage that it is continuous and uniform, and optical wave transmission into the solid material will be the same over the total area of coupling. It has the further advantage that the applied electric field will be uniform in the solid, particularly in the part of the solid which is adjacent to the metal film. The disadvantage of this coupling method is that the optical wave will suffer some coupling losses which will lower the efficiency of transfer of radiation into the solid. A further disadvantage arises when high frequency components are introduced. This is due to the fact that the product of metal sheet resistance and the capacitance between the electrodes determines the shortest response time of the optoelectronic device and sets a limit to the maximum frequency which can be accepted by the device. In order to raise the frequency limits, the sheet resistance $R_S$ can be lowered by using a thicker film for the metal electrode. However, this reduces optical coupling and lowers the efficiency of the optical transmittance into the solid material.

Another way to couple optical radiation through metallic electrodes is to use a screen, a metallic mesh or metal stripes on the solid. This coupling technique has the disadvantage that coupling is efficient only in the open areas of the mesh or screen. The optical radiation which falls on the metallic part of the screen itself will be totally reflected and lost for any further interaction in the solid, and the coupling will therefore not be uniform. Furthermore, the field lines of the applied electric field will converge upon the metal strips, thus creating regions of extremely high field densities separated by regions of low field densities within the solid. Such a structure will not have a uniform response over its area.

It is therefore one object of the present invention to increase the efficiency and uniformity of coupling of radiation into optoelectronic devices.

It is a further object of the invention to increase the speed of operation of optoelectronic devices by introducing a metal electrode with a very low sheet resistance.

An additional object of the invention is to permit an increase in the density of optical radiation within optoelectronic devices in order to increase the interaction of the optical wave and the solid material.

In accordance with the invention, optical frequency electromagnetic wave energy is coupled into the solid through a metal electrode comprising a conductive surface reactance sheet containing apertures which are resonant or nearly resonant at the frequency of the incident energy. Such apertures have openings which are smaller than one wavelength of the incident radiation. The metallic part of the surface sheet serves as an ohmic or non-ohmic contact to the device, and should have a thickness somewhat less than the wavelength of the incident radiation but substantially greater than the field penetration depth. The resonant or nearly resonant openings serve as matching elements for the incident optical radiation, and are electrically equivalent to a parallel resonant circuit which forms a shunt in a transmission line. The equivalent parallel resonant circuit has a high shunt impedance or shunt reactance at the frequency of the incident radiation and therefore does not absorb or reflect the radiation.

The coupling holes or slots can be arranged in a periodic array or they may be distributed in a random pattern. The reaction coupling can be optimized by proper choice of the size of the openings, their geometrical shape, and their spacing or average spacing. Typical openings for optimum coupling have a diameter of approximately one quarter to one half wavelength and are spaced approximately one half to one wavelength apart. The geometrical shape of the opening may be selected to be polarization selective. This particularly true for openings consisting of an array of slots.

The above and other objects of the invention, together with its various features and advantages, will become more readily apparent upon reference to the accompanying drawing and to the following detailed description.

In the drawing:

FIG. 1 is a cross-sectional view of a generalized optoelectronic device;

FIG. 2 is a cross-sectional view of an optoelectronic device in accordance with an illustrative embodiment of the invention;

FIG. 4 is an equivalent circuit given for purposes of explanation;

Figure 6:
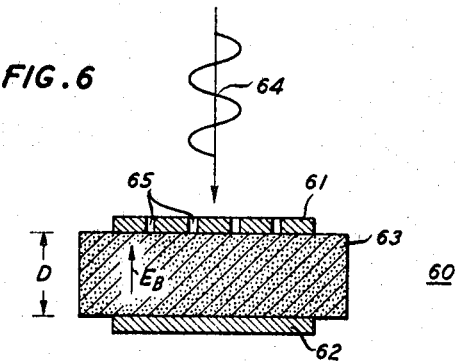
Figure 7:
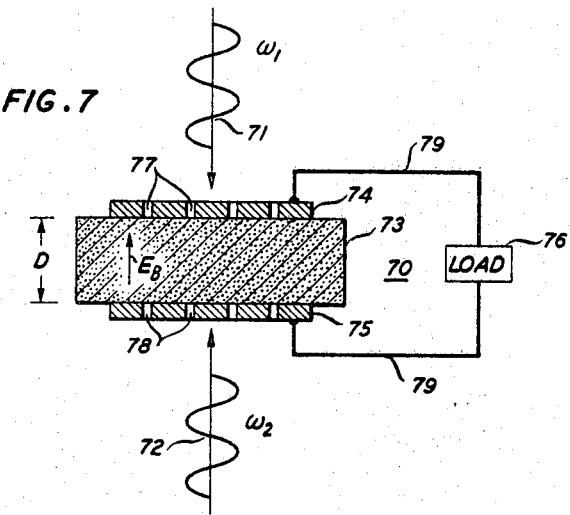
Figure 8:
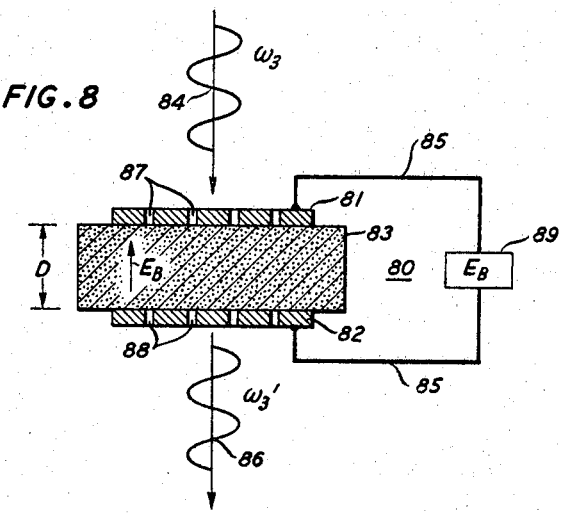

FIGS. 6, 7, and 8 are, respectively, photodetector, mixer, and modulator embodiments in accordance with various embodiments of the invention.

Referring now in detail to FIG. 1, generalized optoelectronic device 10 is illustrated in cross section as comprising a thick substrate layer 11 of bulk material which can be a semiconductive material, such as for example silicon or an electrooptic material such as for example cuprous chloride. Electromagnetic radiation E, indicated by sinusoid 12 on arrow 13, is directed to impinge upon the device 10 at other than normal incidence. Interposed between the incident energy and substrate 11 is an electrode 14 which is metallic and which can advantageously comprise gold. A similar electrode 15 is positioned at the opposite surface of the substrate. External circuit leads 16, 17 are attached to electrodes 14, 15 and are used to apply the electric biasing field $E_B$, indicated by arrow 18, and to carry the current generated within the device to an external circuit.

The device of FIG. 1 can be used in a variety of environments to effect various electrical results as will now be seen.

An optoelectronic device 20 in accordance with one embodiment of the present invention is illustrated in cross section in FIG. 2 in which electrodes 22, 23 are positioned on opposite surfaces of substrate 21, which can be a semiconductive material. Electrode 22, on which optical radiation E indicated by sinusoid 24 on arrow 25 is incident, contains a plurality of apertures 26 which are substantially resonant at the frequency of the incident radiation. These apertures typically have an opening of approximately one quarter to one half wavelength of the incident radiation and are spaced approximately one half to one wavelength apart. An electric field $E_B$ is impressed across the device, in a direction parallel to incident radiation 24 and normal to the broad surfaces of electrodes 22, 23, by bias source 27 connected through leads 28, 28' to the electrodes. A load 29 is connected in series with source 27 and acts as a utilizing means for currents generated in the external circuit for interaction between the incident radiation and the optoelectronic device.

The electrodes have thicknesses less than one wavelength of the incident radiation but greater than the penetration depth of the incident optical energy, while the thickness D of the substrate 21 is considerably greater. For certain applications the distance D can be advantageously selected to be a multiple of a half wavelength of the incident energy. In such resonant substrate cases, the coupling holes would be smaller in size since the amount of energy in the substrate between the electrodes will be greater by reason of the resonance condition.

Figure 3A:
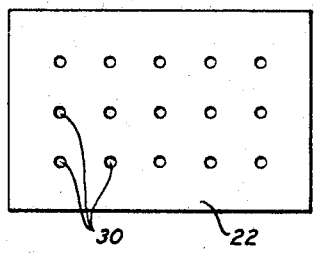
FIGS. 3A, 3B and 3C are top plan views of surface reactance sheets in accordance with various embodiments of the invention.
Figure 3B:
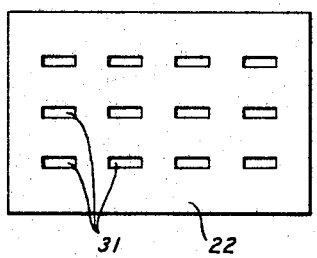
Figure 3C:
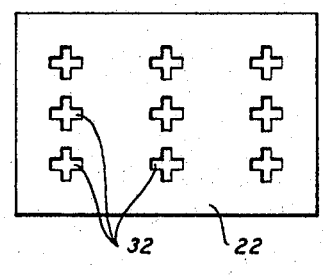

Several appropriate configurations for the apertured electrode 22 of FIG. 2 are shown in plan view in FIGS. 3A–C. Basically, the apertured electrode acts as a surface reactance sheet characterized by low resistance. In FIG. 3A, the apertures in electrode 22 form a periodic array of circular holes 30 dimensioned with hole diameters approximately one quarter to one half wavelength and hole spacings, center to center, of one half to one wavelength.

In FIG. 3B the apertures 31 in sheet 22 take the form of parallel rectangular slots with a typical greater dimension of one half wavelength and a lesser dimension somewhat smaller. Such rectangular openings are polarization selective and can be used in systems in which a plurality of polarizations containing different signal information are transmitted.

FIG. 3C illustrates an alternate arrangement in which reactance plate 22 contains a plurality of apertures 32 in the shape of crosses with slot lengths about one half wavelength.

The mode of operation of the surface reactance sheet can be understood by reference to FIG. 4 which is the equivalent electric circuit for the periodic array of openings as shown in FIGS. 3A, 3B, and 3C. Basically, the electric operation of the reactance sheet is similar to that of a shunt resonant circuit. The incident optical wave 40 is coupled through the equivalent network which consists of series reactances 41 and parallel resonant tank circuit 42. At resonance, the parallel resonant circuit acts like an open circuit and the amplitude of transmitted optical wave 43 is the same as the amplitude of incident wave 40. In practice, of course, the losses are greater than zero, and the transmitted wave is of lesser amplitude than the incident wave. However, the resonance permits significantly greater amount of energy to be transmitted through the essentially "thick" metal electrode.

Figure 5:
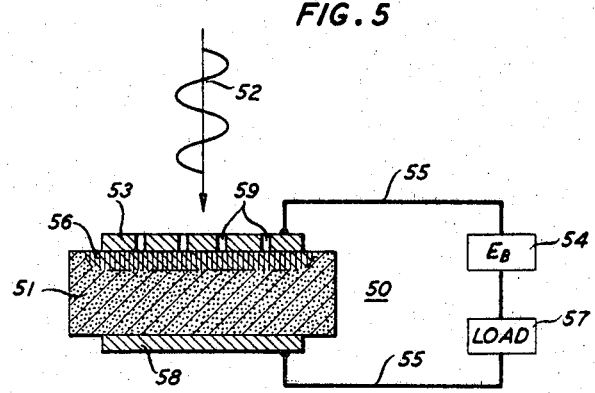
FIG. 5 is a blocking layer semiconductive device.

FIG. 5 is a cross-sectional view of a photodiode in accordance with an illustrative embodiment of the invention. In particular, Schottky barrier photodiode 50 comprises a rectifying metal-to-semiconductor contact in which electron-hole pairs are created in semiconductor 51 by the internal photoelectric effect when illuminated by incident optical radiation 52. Radiation 52 is coupled into semiconductor 51 through reactance sheet 53, which comprises a metallic electrode with an array of apertures 59 as disclosed above as typical of the invention. An external biasing field is applied from source 54 through leads 55 to electrodes 53, 58. Carriers created within the depletion, or blocking, layer 56, or carriers reaching layer 56 by diffusion from the bulk semiconductor 51 are swept across the layer, thereby generating a current in the external circuit leads 55 and in load 57.

Photodiode 50 is an efficient optical radiation detector due to the highly efficient coupling of the incident energy through reactance sheet 53 into the depletion layer. In addition, the low sheet resistance made possible by reactance layer 53 produces fast response for incident modulated optical waves and therefore permits the use of high modulation frequencies.

FIG. 6 is an additional optoelectronic device 60 with a reactance sheet 61 and a metal contact 62 on semiconductor 63 illuminated by optical radiation 64. Reactance sheet 61, with an array of apertures 65 in accordance with the general principles of the invention, and contact 62 serve as ohmic contacts to semiconductor 63, and biasing field $E_B$ is applied across them.

The thickness D of the device 60 is a multiple of one half wavelength of the incident energy. Thus the optical wave is effectively resonant within the semiconductive material, thereby providing a high degree of absorption of the optical wave within the semiconductor resulting in particularly efficient photoconductor action. As mentioned, the coupling apertures 65 are dimensioned to be less than one quarter wavelength in diameter.

FIG. 7 is a cross-sectional view of an optical mixer 70 in accordance with the general principles of the invention in which two incident optical waves, 71 and 72 of frequencies $\omega_1$ and $\omega_2$, respectively, are coupled into semiconductor 73 by separate reactance sheets 74, 75 containing apertures 77, 78, respectively, and disposed on opposite surfaces of the semiconductor. Mixing or heterodyning action will occur, in the presence of a biasing field $E_B$, within the semiconductor by means of the internal photoelectric or photoconductive effect, and a signal current modulated at the difference frequency $(\omega_1-\omega_2)$ will flow in external leads 79 through load 76. If desired, the sensitivity of the optical mixing can be enhanced by using a semiconductor 73 with a thickness D equal to a multiple of a half wavelength for both of the incident waves 71, 72.

FIG. 8 is a cross-sectional view of an electro-optic modulator 80 in accordance with the general principles of the invention. Two reactance sheets 81, 82 are disposed on opposite sides of an element of electrooptic material 83 which is characterized by a refractive index which changes in response to the magnitude of an applied external field, such as for example, potassium dihydrogen phosphate (KDP) or cuprous chloride. Incident optical radiation 84 of frequency $\omega_3$ is coupled into material 83 through apertures 87 in reactance sheet 81. A variable external biasing field $E_B$ is applied from an external source 89 through external leads 85. The varying refractive index exhibited by the bulk material produces an amplitude or phase modulation of the output optical radiation 86, designated $\omega_1'$ and emitted through apertures 88 in electrode 82. If desired, enhancement of the electrooptic effect can be realized by selecting the thickness D of insulator 83 to be a half wavelength multiple of the incident radiation.

Surface reactance electrodes in accordance with the invention can be easily fabricated by covering the surface of the bulk material with a coating of gold by evaporation, sputtering, or electrochemical deposition. This prepared surface is then covered with a photoresist such as, for example, Kodak Thin Film Resist, and is exposed to ultraviolet light through a mask containing the desired aperture array or by projecting an optical pattern on the surface. The photoresist is then developed and an array of slots or holes is etched through the metal by immersion in hydrochloric acid, for example.

In all cases it is understood that the above-described arrangements are only illustrative of the principles of the invention. Numerous and varied other embodiments can be devised by those skilled in the art without departing from the spirit and scope of the invention.

What is claimed is:
1. An optoelectronic device for incident optical energy within a given frequency range comprising
   a bulk material substrate having first and second opposed surfaces,
   a first conductive metallic layer disposed on said first surface,
   said metallic layer containing a plurality of apertures resonant for energy within said frequency range,
   a second conductive metallic layer disposed on said second surface,
   means for impressing an electric field between said electrodes, and
   means for applying said optical energy to said first metallic layer.
2. The device according to claim 1 in which said bulk material is a semiconductor.
3. The device according to claim 2 in which said apertures are circular holes.
4. The device according to claim 2 in which said apertures are slots with a long dimension approximately equal to one half wavelength of said energy.
5. The device according to claim 2 in which said apertures are crosses with equal side arm dimensions approximately equal to one half wavelength of said energy.
6. The device according to claim 2 in which said optical energy is incident normal to said first metallic layer.
7. The device according to claim 2 in which said second metallic layer contains a plurality of apertures resonant for energy within said frequency range; and which includes in addition means for applying wave energy to said second metallic layer.
8. The device according to claim 7 in which a first beam of energy of frequency $\omega_1$ is incident upon said first layer and a second beam of energy of frequency $\omega_2$ is incident upon said second layer.
9. The device according to claim 1 in which said bulk material is an electrooptic material.
10. The device according to claim 9 in which said second metallic layer contains a plurality of apertures resonant for energy within said frequency range; and which includes in addition means for applying wave energy to said second metallic layer.
11. The device according to claim 10 in which the thickness of said bulk material is a multiple of one half wavelength of said energy.
12. An optoelectronic device for incident optical energy within a given frequency range comprising
    a bulk material substrate having first and second opposed surfaces and a thickness between said surfaces equal to a multiple of half wavelengths of said energy,
    a first conductive metallic layer disposed on said first surface,
    said metallic layer containing a plurality of apertures of dimension less than one half wavelength of said energy,
    a second metallic layer disposed on said second surface,
    means for impressing an electric field between said electrodes, and
    means for applying said optical energy to said first metallic layer.
13. The device according to claim 12 in which said second metallic layer contains a plurality of apertures of dimension less than one half wavelength of said energy; and which includes in addition means for applying wave energy to said second metallic layer.
14. The device according to claim 13 in which a first beam of energy of frequency $\omega_1$ is incident upon said first layer and a second beam of energy of frequency $\omega_2$ is incident upon said second layer.

References Cited

UNITED STATES PATENTS

| 3,027,806 | 4/1962 | Koelsch et al. | 250—199 |
| 3,117,229 | 1/1964 | Friedland | 250—199 |
| 3,121,203 | 2/1964 | Heywang | 250—199 |
| 3,196,274 | 7/1965 | Giordmaine | 250—199 |

ROBERT L. GRIFFIN, Primary Examiner

A. J. MAYER, Assistant Examiner

U.S. Cl. X.R.

332—7.51